(12) United States Patent
Van Belleghem et al.

(10) Patent No.: US 9,756,976 B2
(45) Date of Patent: Sep. 12, 2017

(54) DEVICE FOR PREPARING INFUSED DRINKS, COMPRISING A PIVOTING CAPSULE SUPPORT

(71) Applicant: TCONCEPT COMPANY S.P.R.L., Corroy-le-Grand (BE)

(72) Inventors: Luc Van Belleghem, Corry-le-Grand (BE); Yohann Beaufils, Hérouville St Clair (FR)

(73) Assignee: TCONCEPT COMPANY S.P.R.L., Corry-le-Grand (BE)

( * ) Notice: Subject to any disclaimer, the term of this patent is extended or adjusted under 35 U.S.C. 154(b) by 17 days.

(21) Appl. No.: 14/901,262

(22) PCT Filed: Jun. 24, 2014

(86) PCT No.: PCT/EP2014/063301
§ 371 (c)(1),
(2) Date: Dec. 28, 2015

(87) PCT Pub. No.: WO2014/206993
PCT Pub. Date: Dec. 31, 2014

(65) Prior Publication Data
US 2016/0324361 A1 Nov. 10, 2016

(30) Foreign Application Priority Data

Jun. 25, 2013 (BE) .................... 2013/0438

(51) Int. Cl.
*A47J 31/36* (2006.01)
*A47J 31/40* (2006.01)
*A47J 31/60* (2006.01)

(52) U.S. Cl.
CPC ......... *A47J 31/3638* (2013.01); *A47J 31/369* (2013.01); *A47J 31/3633* (2013.01); *A47J 31/407* (2013.01); *A47J 31/60* (2013.01)

(58) Field of Classification Search
CPC .. A47J 31/3638; A47J 31/3633; A47J 31/369; A47J 31/407; A47J 31/60
See application file for complete search history.

(56) References Cited

U.S. PATENT DOCUMENTS

| 2009/0183640 A1* | 7/2009 | Ozanne | A47J 31/3695 99/295 |
| 2010/0101428 A1 | 4/2010 | Fin | |
| 2013/0340627 A1* | 12/2013 | Stefanoni | A47J 31/3633 99/295 |

FOREIGN PATENT DOCUMENTS

EP 2112093 10/2009

* cited by examiner

*Primary Examiner* — Erik Kashnikow
*Assistant Examiner* — Chaim Smith
(74) *Attorney, Agent, or Firm* — Duane Morris LLP; J. Rodman Steele, Jr.; Gregory M. Lefkowitz

(57) ABSTRACT

The invention relates to a device comprising: a support arranged to receive a capsule provided with a front face, a filter wall, a ring, a rear face and a solid casing extending between the ring and the rear face and defining a receptacle containing the material to be infused; injection means; an infusion chamber having a substantially vertical opening arranged to be in fluid communication with the filter wall, said ring comprising sealing means arranged to maintain the fluid communication sealed from the surrounding medium; and an outlet.

13 Claims, 5 Drawing Sheets

DEVICE FOR PREPARING INFUSED DRINKS, COMPRISING A PIVOTING CAPSULE SUPPORT

CROSS-REFERENCE TO RELATED APPLICATIONS

This application is a §371 national stage entry of International Application No. PCT/EP2014/063301, filed Jun. 24, 2014, which claims priority to Belgian Patent Application No. 2013/0438 filed Jun. 25, 2013, the entire contents of which are incorporated herein by reference.

The present invention relates to a device for preparing infused drinks comprising:
- a support arranged to receive a capsule containing a substance to be infused in the dry state provided with a front face comprising a filter wall, a ring surrounding said front face, a rear face, opposite said front face and a solid casing extending between said ring and said rear face and defining a container arranged to contain said substance to be infused,
- injection means arranged to introduce an infusion liquid into said capsule,
- an infusion chamber having a substantially vertical opening, said substantially vertical opening being arranged to be in fluid communication with said filter wall, said ring comprising sealing means arranged to keep the fluid communication tight in relation to a surrounding medium, outside a fluid exchange zone, and
- an outlet provided with closing/opening means arranged to enable an infused liquid to flow from the infusion chamber.

Such a device or method is known for example from the document EP2112093. However, according to this document, the water is injected via the rear face of the capsule, thus requiring piercing thereof.

Unfortunately, rear piercing of the capsule requires, firstly, a practically perfect horizontal alignment of the tip used to pierce the rear face and, secondly, manufacturing a capsule with a rupture zone. As such, the manufacture of such a device is complex as it requires precision mechanics to obtain a tip perfectly perpendicular to the rear face to be ruptured which is jeopardised by the use of the device over time. Furthermore, the capsule frequently remains impaled on the tip and thus cannot be easily removed without human intervention, which in turn sometimes requires dismantling a part of the device or rendering the area wherein the capsule is stuck easily accessible. Therefore, there is a need to use an alternative system for ejecting a capsule.

The aim of the invention is that of remedying the drawbacks of the prior art by providing an invention making it possible to simplify the design of the machine and solve the problems of capsules stuck and/or impaled on said tip.

To solve this problem, the invention envisages a device as initially described characterised in that said support is in the form of a seat comprising a base structure having a complementary shape to the shape of said casing, said seat being substantially open on the top to make it possible to receive said capsule when it moves down, said seat comprising a projection provided with an attachment zone and a segment rigidly connected to said attachment zone and forming an angle between 25 and 80 degrees with a median horizontal plane with said seat, and a junction, between said attachment zone and the segment, provided with an opening through which a pivot axis passes, substantially transversal to said projection, said attachment zone connecting said seat to said junction, said segment extending from said junction to a free end, and comprising a bearing zone for following means, said device further comprising following means moved by a cam, for example rigidly connected to a gear actuated by a servo-motor, said cam comprising at least a first profile part and a second profile part, each profile part moving said following means, said first profile part corresponding to a position of the following means such that the following means apply pressure on said bearing zone such that the seat has a position for receiving said capsule and ensures the alignment of the front face of the capsule with said substantially vertical opening of said infusion chamber, said second profile part corresponding to a position of the following means such that the following means are released from the infusion position to an idle position and no longer apply pressure on said bearing zone, making it possible to release the capsule and enable the removal thereof to a receptacle arranged to receive said capsule to be removed.

Advantageously, the following means (18) may be either a following plunger (18) or a follower (18), the cam is provided with a cam follower acting as a driver.

In one advantageous embodiment according to the present invention, said device also comprises a tube for injecting infusion liquid connected to an upper part of said infusion chamber in the vicinity of said substantially vertical opening.

Particularly preferentially, said infusion chamber is at least partially formed of a polyfluoride-based material, such as for example PTFE, FEP, or PFA.

Equally preferentially, the device according to the invention further comprises cleaning means arranged to introduce a rinsing liquid into said infusion chamber.

Advantageously, the device according to the invention also comprises means for heating said infusion liquid.

Preferably, the device according to the invention further comprises a container of infusion liquid, connected to or comprising said means for heating said infusion liquid.

In particular, the device also comprises, according to the present invention, a pump connected on one hand to said infusion liquid injection tube and to a supply of infusion liquid, connected to said device for heating said infusion liquid.

In one alternative embodiment of the present invention, the device further comprises a pump connected on one hand to said infusion liquid injection tube and to a supply of infusion liquid, optionally in the form of said container of infusion liquid.

Preferably, the device according to the invention comprises a pressure regulating device, connected to said infusion liquid injection tube and to a supply of infusion liquid, optionally upstream or downstream from said pump, if present.

Advantageously, said infusion liquid injection tube has a rectilinear zone, wherein one end is connected to said infusion chamber, said rectilinear zone being substantially vertical.

More particularly, said rectilinear zone of said infusion liquid injection tube is at least partially formed of a polyfluoride-based material, such as for example PTFE, FEP, or PFA.

In one particularly preferential embodiment, said rectilinear zone of said infusion liquid injection tube is for example obtained by simultaneous moulding of said infusion chamber and said rectilinear zone.

In a further particularly preferential embodiment, said infusion chamber comprises an apex through which pass a first horizontal top tangent plane and a median plane separating the infusion chamber into two parts wherein a first part comprises said substantially vertical opening, said substantially vertical opening also having an apex through which a second horizontal tangent plane passes, parallel with said first horizontal top tangent plane, said injection tube of said infusion liquid being connected to said infusion chamber via an infusion liquid passage opening through an external wall of said infusion chamber, said infusion liquid passage opening being situated between the first and the second tangent planes and in said first part.

Further embodiments of the device according to the invention are described in the appended claims.

The invention also relates to a method for preparing infused drinks, comprising the following steps:
introducing a capsule containing a substance to be infused in the dry state provided with a front face comprising a filter wall, a ring surrounding said front face, a rear face, opposite said front face and a solid casing extending between said ring and said rear face and defining a container arranged to contain said substance to be infused, in a position wherein said front face is substantially vertical, onto a capsule support,
injecting an infusion liquid into said container of said capsule,
infusing said infusion liquid with said dry substance to be infused so as to form said infused drink in said infusion chamber in fluid communication with the capsule container, and
draining said infused liquid via an opening located in the bottom of said infusion chamber after said infusion step.

This method is characterised in that said support in the form of a seat comprising a base structure having a complementary shape to the shape of said casing, said seat being substantially open on the top to make it possible to receive said capsule when it moves down, said seat comprising a projection provided with an attachment zone and a segment rigidly connected to said attachment zone and forming an angle between 25 and 80 degrees with a median horizontal plane with said seat, and a junction, between said attachment zone and the segment, provided with an opening through which a pivot axis passes, substantially transversal to said projection, said attachment zone connecting said seat to said junction, said segment extending from said junction to a free end, and comprising a bearing zone for following means moved by a cam, for example rigidly connected to a gear actuated by a servo-motor, is in the receiving position during said introduction of the capsule wherein said following means are driven by a first profile part of said cam and apply a first pressure on said bearing zone at least until the end of said step for draining the infused liquid and is in the position for removing the capsule after said infusion step wherein said following means are driven by a second profile part of said cam and are released from the receiving position to a position for removing the capsule, no longer applying pressure on said bearing zone and making it possible to release the capsule for the removal thereof to a receptacle arranged to receive said capsule to be removed.

Advantageously, said injection of an infusion liquid into said container of said capsule takes place by injecting said infusion liquid in the infusion chamber in fluid communication with said container of said capsule, said infusion liquid flowing into the infusion chamber percolating through said filter wall to enter said capsule container.

In one preferred embodiment of the present invention, a part of the infusion step takes place simultaneously with said injection step.

In a further preferred embodiment of the invention, said injection of said infusion liquid is carried out from top to bottom and causes turbulence in the infusion liquid already present in the infusion chamber, so as to homogenise the contents of the infusion liquid.

Preferably, the method according to the invention further comprises a cleaning step wherein a rinsing fluid is introduced into and drained from the infusion chamber and during which said seat is in the receiving position, at least at the start of said cleaning step.

Further embodiments of the method according to the invention are described in the appended claims.

Further features, details and advantages of the invention will emerge from the description given hereinafter, for non-limiting purposes and with reference to the appended figures.

Figure 1:
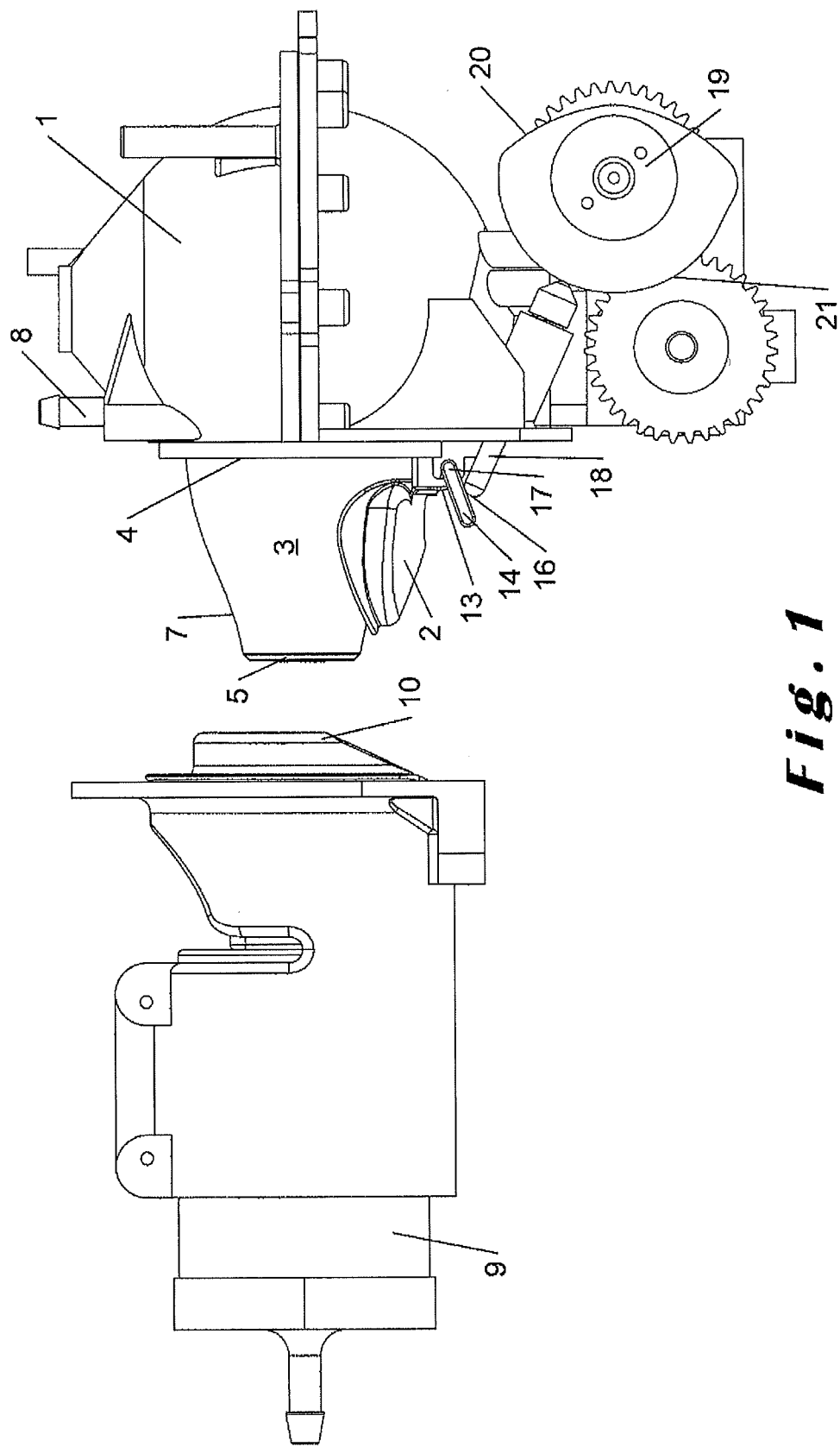
FIG. 1 is a schematic view of a device according to the invention.

In the figures, identical or equivalent elements bear the same references.

One aspect of the present invention relates to a device intended to receive a capsule of ingredients and extract the ingredient by injecting liquid into a capsule and into and via an infusion chamber.

As can be seen in FIGS. 1 to 5, the device for preparing infused drinks comprises a support (2) arranged to receive a capsule (3) containing a substance to be infused in the dry state provided with a front face (4) comprising a filter wall, a ring surrounding said front face (4), a rear face (5), opposite said front face (4) and a solid casing (7) extending between said ring and said rear face (5) and defining a container arranged to contain said substance to be infused.

The device also comprises injection means arranged to introduce an infusion liquid into said capsule (3), and an infusion chamber (1) having a substantially vertical opening (8), said substantially vertical opening (8) being arranged to be in fluid communication with said filter wall, said ring comprising sealing means arranged to keep the fluid communication tight in relation to a surrounding medium, outside a fluid exchange zone.

The device also comprises an outlet provided with closing/opening means arranged to enable an infused liquid to flow from the infusion chamber.

In the device illustrated in FIGS. 1 to 5, the means for injecting said infusion liquid reach the infusion chamber (1) via an infusion liquid injection tube.

The capsule (3) will be positioned between two parts. The two parts are arranged so as to be movable in relation to one another from an open position—for inserting or removing a capsule (3)—to a closing position—to pass a heated liquid in the capsule (3).

For this purpose, the device comprises a cylinder (9), as illustrated in FIG. 1, comprising a first end and a second end, said first end comprising a contact zone (10), preferably a contact zone having a plane surface, arranged to push said rear face (5) of the capsule (3), and translation means arranged to create a horizontal relative translational movement between said cylinder (9) and said infusion chamber (1) so as to maintain the tightness between the capsule (3)

and said infusion chamber (1) by a compression force applied onto said sealing means maintaining the fluid communication, said translation means are connected to said cylinder (9), said cylinder (9) having a first retracted position and a second contact position, said translation means being arranged to move said cylinder (9) between said first position and said second position, corresponding to a position wherein said capsule (3) is in tight contact with said infusion chamber (1) and where said compression force is applied onto said sealing means.

In this way, the present invention makes it possible to provide an apparatus where the water injection is performed in the infusion chamber (1) or in the container of the capsule (3) and which thus makes it possible to do away with a low-voltage motor to actuate the piercing of the rear face (5) of the capsule (3) and to supply water via the opening pierced in the rear face (5). Simple translation means using the energy present or human energy are envisaged, without any additional device such as a low-voltage motor, making it possible to carry out a relative translation between the infusion chamber (1) and a cylinder (9) maintaining the tightness between the capsule (3) and the infusion chamber (1) to ensure fluid communication between the two.

Furthermore, in this way, the infusion liquid enters, by means of the injection tube, said infusion chamber (1) via the top of the infusion chamber and flows so as to progressively fill the assembly consisting of the infusion chamber (1) in fluid communication with said container defined by said solid casing (7) extending between said ring and said rear face (5), wherein the substance to be infused is located. The capsule (3) container is also progressively filled at the same rate as the infusion chamber (1) and the infusion liquid supplying the infusion chamber (1) or the capsule (3), thus flowing from the top to the bottom, creates turbulence in a part of the infusion liquid already present thus forming turbulence in the infusion liquid contained in the assembly consisting of the infusion chamber (1) and the capsule (3) for enhancing the homogeneity of the infusion liquid which becomes the infused liquid over time and mixing of this infusion liquid. Furthermore, this injection of injection liquid via the infusion chamber (1) makes it possible to obtain a difference in temperature of the infusion liquid present in the infusion chamber and that present in the capsule (3) container between 3 and 7° C. and typically approximately 5° C. Note that, during the entire infusion liquid injection phase, the newly injected infusion liquid heats the infusion liquid already present.

The present invention relates more particularly to the system for positioning and ejecting a capsule (3). It is important to position the capsule (3) correctly such that the device closes correctly around same and satisfactory tightness is thus created to ensure satisfactory infusion conditions. Poor positioning may damage the capsule (3), and thus affect the infusion conditions. The loading of the capsule (3) should also be easy, with no trial and error in respect of the correct position of the capsule (3) in the device. Loading should also be as quick as possible and not require excessive operations.

The aim of the present invention is that of providing the consumer with a system for positioning and ejecting the capsule (3) that has a simpler and mechanically reliable design.

For this purpose, said support (2) is in the form of a seat (2) comprising a base structure having a complementary shape to the shape of said casing (7). The seat (2) is substantially open on the top to make it possible to receive said capsule (3) when it moves down and comprises a projection (13) provided with an attachment zone (15) and a segment (14) rigidly connected to said attachment zone (15) and forming an angle between 25 and 80 degrees with a median horizontal plane of said seat (2) and a junction (17), between said attachment zone (15) and the segment (14), provided with an opening through which a pivot axis passes, substantially transversal to said projection (13). The attachment zone (15) connects the seat (2) to said junction (15) whereas the segment (14) extends from said junction (17) to a free end, and comprising a bearing zone for following means (18).

Figure 2:
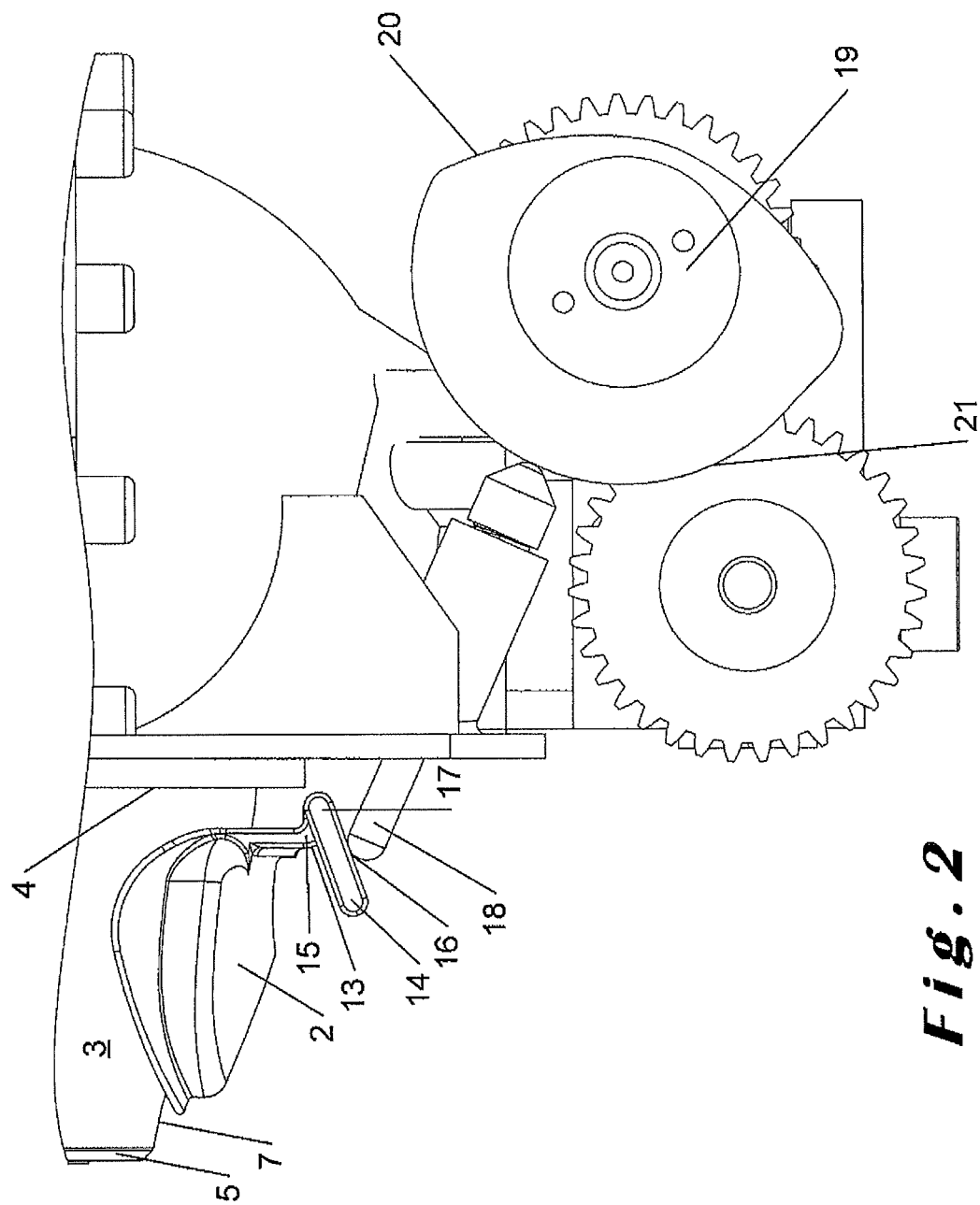
FIG. 2 is a schematic view of a pivoting capsule support according to the invention.
Figure 3:
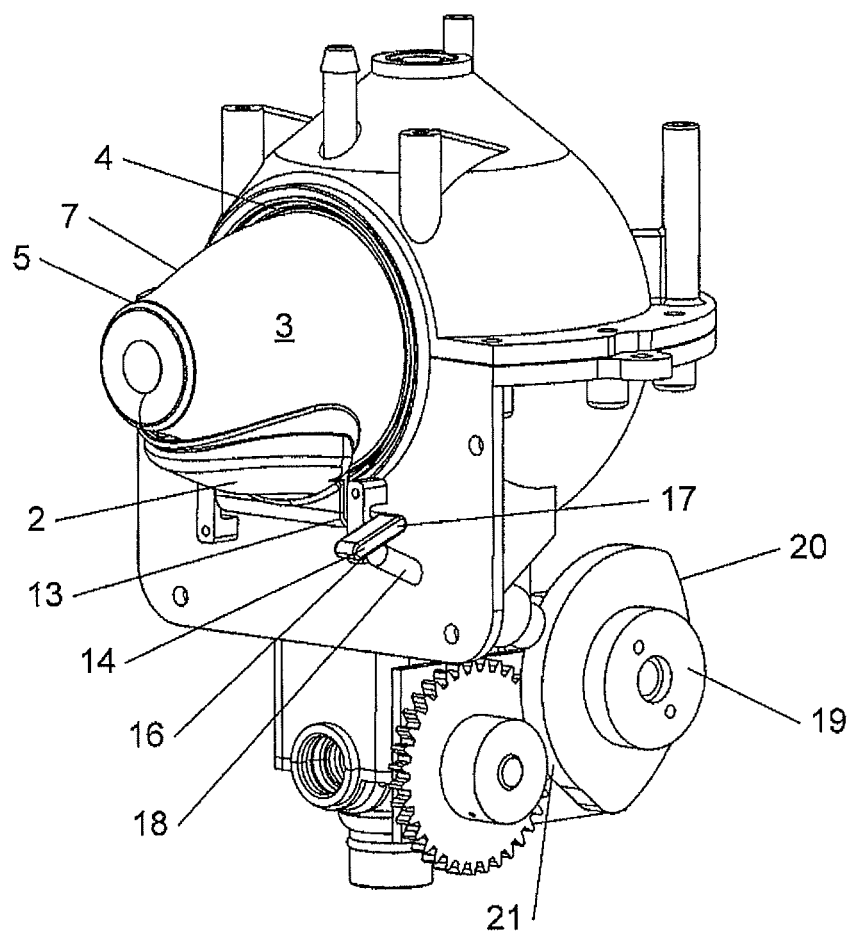
FIG. 3 is a schematic view of a pivoting capsule support according to the invention.
Figure 4:
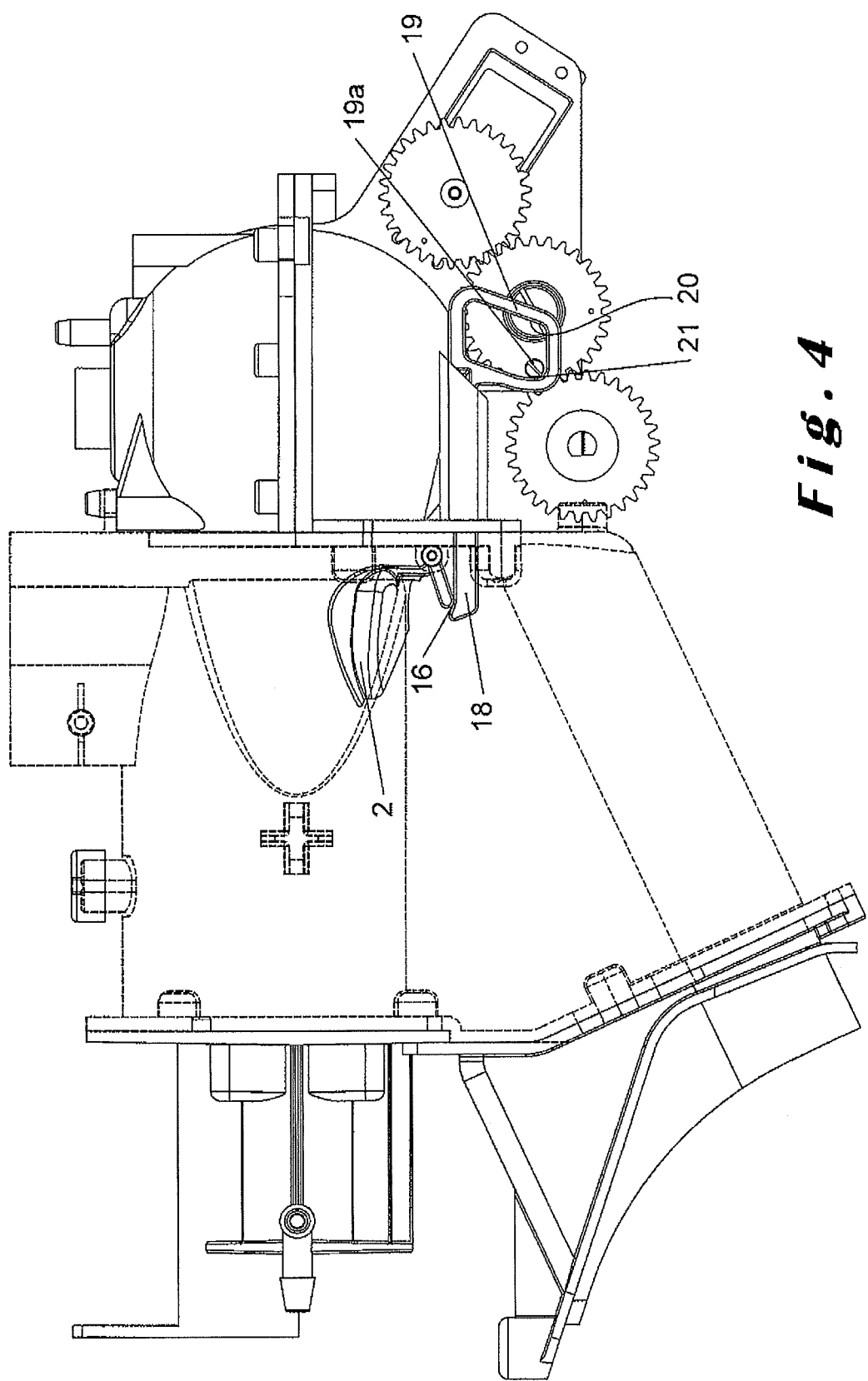
FIG. 4 represents a view of an alternative embodiment of the device according to the present invention.
Figure 5:
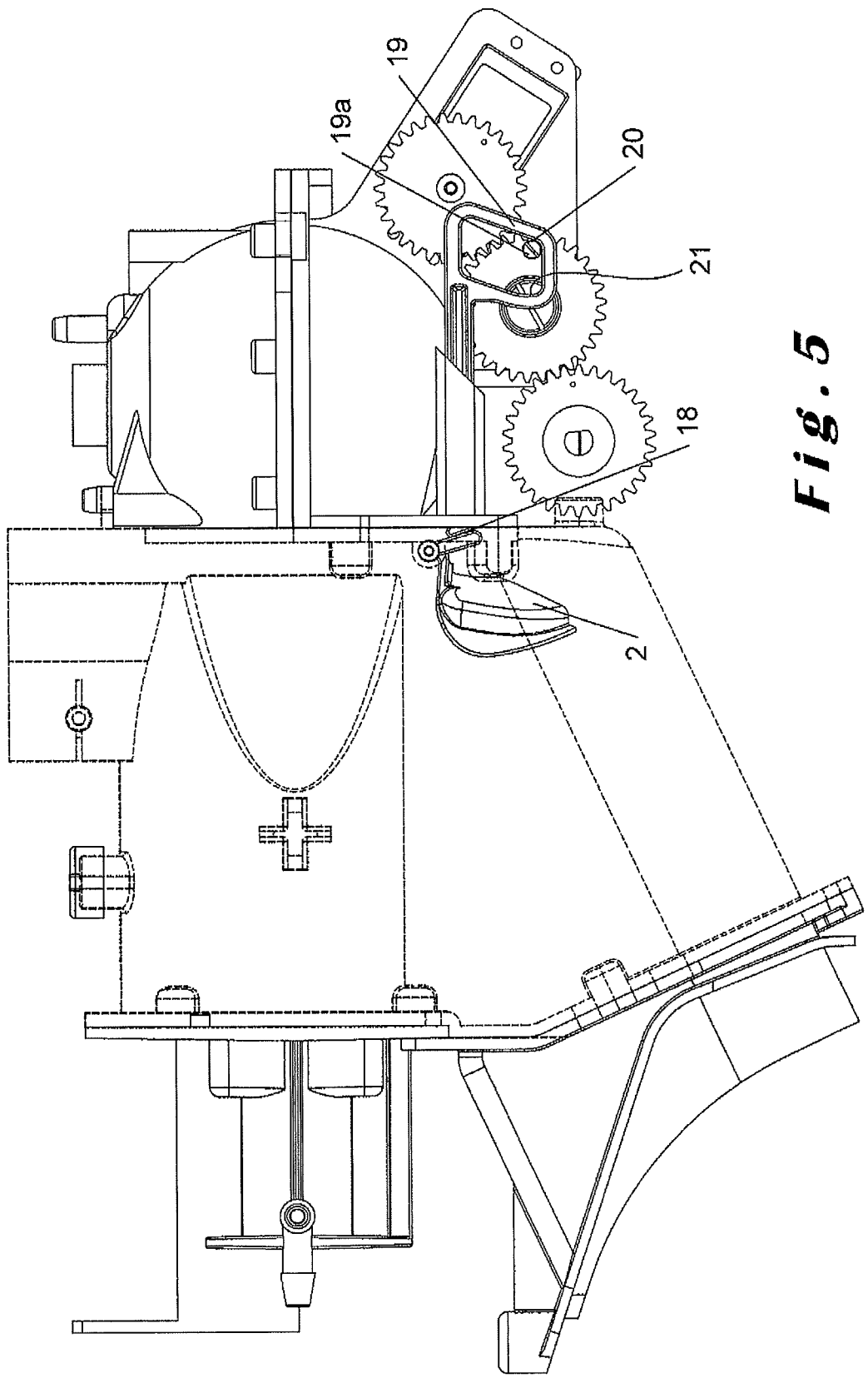
FIG. 5 illustrates a view of an alternative embodiment of the device according to the present invention.

Advantageously, the following means (18) may be either a following plunger (18) as illustrated in FIGS. 1 to 3 or merely a follower (18) as represented in FIGS. 4 and 5.

The following plunger (18), illustrated in FIGS. 1 to 3, is moved by a cam (19) actuated by a cam shaft and coupled with a valve or is rigidly connected to a gear actuated by a servo-motor. The cam (19) comprises a first profile part (21) and a second profile part (20), each profile part moving said following plunger (18).

The first profile part (21) corresponds to a position of the following means (18) such that the following means apply pressure on said bearing zone such that the seat (2) has a position for receiving said capsule (3) and ensures the alignment of the front face (4) of the capsule (3) with said substantially vertical opening (8) of said infusion chamber (1).

The second profile part (20) corresponds to a position of the following means (18) such that the following means are released from the infusion position to an idle position and no longer apply pressure on said bearing zone, making it possible to release the capsule (3) and enable the removal thereof to a receptacle arranged to receive said capsule (3) to be removed.

FIGS. 4 and 5 illustrate following means (18) presented in the form of a mere follower (18). This preferred embodiment comprises all the elements described above, particularly for the following means (18) illustrated in FIGS. 1 to 3. However, in this preferred configuration of the device according to the invention, the follower (18) is moved by a cam (19) which is provided with a cam follower acting as a driver.

As such, when the cam follower is adjacent to the first profile part (21), as illustrated in FIG. 4, the follower applies pressure on said bearing zone such that the seat (2) is ready to receive the capsule (3).

When the cam follower is adjacent to the second profile part (20), as shown in FIG. 5, the follower adopts an idle position wherein it no longer applies pressure on the bearing zone. The capsule (3) may then be released from the device according to the invention. In fact, the device according to the invention, illustrated in FIGS. 1 to 5, makes it possible to switch the capsule (3) from an insertion position to an infusion position when at least one of the two movable parts of the device positions same in the closed position, it switches it to the ejection position thereof and when the movable part is open after infusion, the capsule (3) is released naturally merely under the effect of gravitation. It drops into a drawer or any other means for retrieving used capsules (3) and the consumer is ready to reload the device.

In order to handle these different positions, the device comprises a pivoting seat (2) suitable for being set to a position for receiving the capsule (3) or set to a position for ejecting the capsule (3) gravitationally.

The device according to the present invention also coordinates the positions of the seat (2), the capsule (3) support accounting for the inherent processes of an infusion comprising an infusion chamber (1).

Advantageously, this infusion chamber (1) experiences one or more heated water injection cycles, enabling the infusion of the substances contained in the capsules (3). This water injection phase will require perfect positioning and tightness of the capsule (3) with the chamber and a closed position of the infused liquid flow channel.

At the end of the infusion time, the flow channel will be open in the direction of the cup.

Typically, this device comprises a multi-way valve. Once the liquid has flowed, a second process starts in order to inject a rinsing liquid or gas into the infusion chamber (1). This process starts with the support (2) of the capsule (3) kept in the receiving position thereof and still tight with the chamber (1). Then, the support (2) of the capsule (3) will switch to the ejection position and the capsule (3) will be ejected gravitationally. This phase is suitable at the end of the rinsing cycle for being performed without the presence of the capsule (3) and thus with no risk of the infused liquid liable to be still located therein flowing into the infusion chamber (1).

The positions of the support imposed by the cam (19) are thus coupled with the positions of the multi-way valve handling the flow of the infused liquid of rinsing liquid from the infusion chamber (1).

Obviously, the present invention is in no way limited to the embodiments described above and many modifications may be made thereto without leaving the scope of the appended claims.

The invention claimed is:

1. Device for preparing infused drinks comprising:
   a support arranged to receive a capsule containing a substance to be infused in the dry state provided with a front face comprising a filter wall, a ring surrounding said front face, a rear face, opposite said front face and a solid casing extending between said ring and said rear face and defining a container arranged to contain said substance to be infused,
   injection means arranged to introduce an infusion liquid into said capsule,
   an infusion chamber having a substantially vertical opening, said substantially vertical opening being arranged to be in fluid communication with said filter wall, said ring comprising sealing means arranged to keep the fluid communication tight in relation to a surrounding medium, outside a fluid exchange zone, and
   an outlet provided with closing/opening means arranged to enable an infused liquid to flow from the infusion chamber,
   wherein said support is in the form of a seat comprising a base structure having a complementary shape to the shape of said casing, said seat being substantially open on the top to make it possible to receive said capsule when it moves down, said seat comprising a projection provided with an attachment zone and a segment rigidly connected to said attachment zone and forming an angle between 25 and 80 degrees with a median horizontal plane of said seat, and a junction, between said attachment zone and the segment, provided with an opening through which a pivot axis passes, substantially transversal to said projection, said attachment zone connecting said seat to said junction, said segment extending from said junction to a free end, and comprising a bearing zone for following means, said device further comprising following means moved by a cam, rigidly connected to a gear actuated by a servo-motor, said cam comprising at least a first profile part and a second profile part, each profile part moving said following means, said first profile part corresponding to a position of the following means such that the following means apply pressure on said bearing zone such that the seat has a position for receiving said capsule and ensures the alignment of the front face of the capsule with said substantially vertical opening of said infusion chamber, said second profile part corresponding to a position of the following means such that the following means are released from the infusion position to an idle position and no longer apply pressure on said bearing zone, making it possible to release the capsule and enable the removal thereof to a receptacle arranged to receive said capsule to be removed.

2. Device according to claim 1, further comprising a tube for injecting said infusion liquid connected to an upper part of said infusion chamber in the vicinity of said substantially vertical opening.

3. Device according to claim 1, wherein said infusion chamber is at least partially formed of a polyfluoride-based material, such as for example PTFE, FEP, or PFA.

4. Device according to claim 1, further comprising cleaning means arranged to introduce a rinsing liquid into said infusion chamber.

5. Device according to claim 1, comprising means for heating said infusion liquid.

6. Device according to claim 5, further comprising a container of infusion liquid, connected to or comprising said means for heating said infusion liquid.

7. Device according to claim 6, further comprising a pump connected on one hand to said infusion liquid injection tube and to a supply of infusion liquid, connected to said device for heating said infusion liquid.

8. Device according to claim 1, further comprising a pump connected on one hand to said infusion liquid injection tube and to a supply of infusion liquid, optionally in the form of said container of infusion liquid.

9. Device according to claim 1, further comprising a pressure regulating device, connected to said infusion liquid injection tube and to a supply of infusion liquid, optionally upstream or downstream from said pump, if present.

10. Device according to claim 1, wherein said infusion liquid injection tube has a rectilinear zone, wherein one end is connected to said infusion chamber, said rectilinear zone being substantially vertical.

11. Device according to claim 10, wherein said rectilinear zone of said infusion liquid injection tube is at least partially formed of a polyfluoride-based material, such as for example PTFE, FEP, or PFA.

12. Device according to claim 11, wherein said rectilinear zone of said infusion liquid injection tube is rigidly connected to said infusion chamber and is for example obtained by simultaneous moulding of said infusion chamber and said rectilinear zone.

13. Device according to claim 1, wherein said infusion chamber comprises an apex through which pass a first horizontal top tangent plane and a median plane separating the infusion chamber into two parts wherein a first part comprises said substantially vertical opening, said substantially vertical opening also having an apex through which a second horizontal tangent plane passes, parallel with said first horizontal top tangent plane, said injection tube of said infusion liquid being connected to said infusion chamber via an infusion liquid passage opening through an external wall of said infusion chamber, said infusion liquid passage opening being situated between the first and the second tangent planes and in said first part.

* * * * *